J. L. POULTNEY.
AUTOMOBILE FIRE ENGINE.
APPLICATION FILED JUNE 24, 1910.
1,004,816.
Patented Oct. 3, 1911.
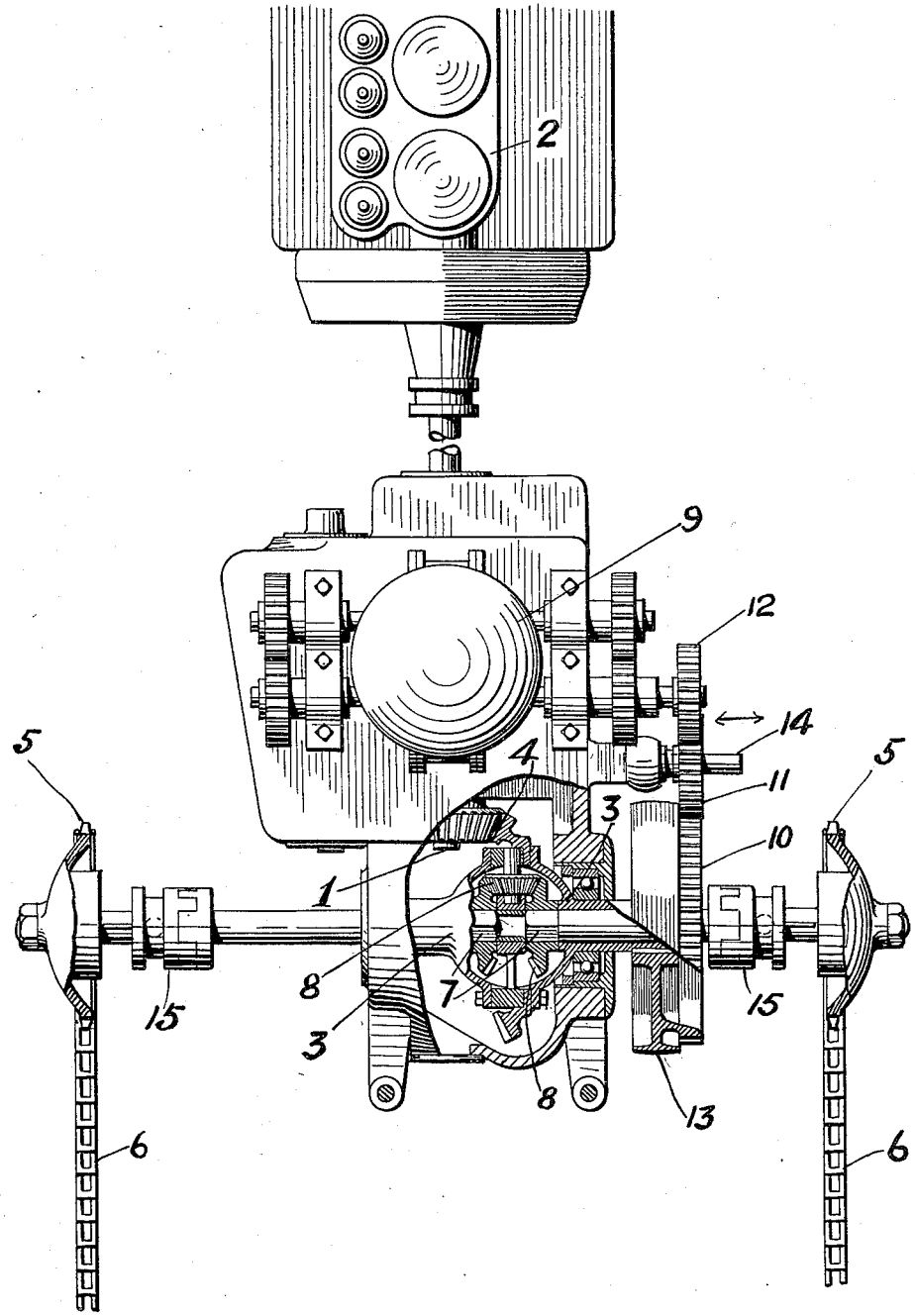
WITNESSES:
Rob R Kitchel
A. M. Gilligan
INVENTOR
John L. Poultney
BY
Augustus B. Stoughton
ATTORNEY.

UNITED STATES PATENT OFFICE.

JOHN LIVINGSTON POULTNEY, OF HAVERFORD, PENNSYLVANIA, ASSIGNOR TO JAMES BOYD & BROTHER, INC., OF PHILADELPHIA, PENNSYLVANIA, A CORPORATION OF PENNSYLVANIA.

AUTOMOBILE FIRE-ENGINE.

1,004,816.  Specification of Letters Patent.  Patented Oct. 3, 1911.

Application filed June 24, 1910. Serial No. 568,651.

*To all whom it may concern:*

Be it known that I, JOHN L. POULTNEY, a citizen of the United States, residing at Haverford, Delaware county, Pennsylvania, have invented certain new and useful Improvements in Automobile Fire-Engines, of which the following is a specification.

The principal object of the present invention is to provide for driving the pump of an automobile fire engine at different speeds so that the engine can work at maximum efficiency and the pump can work at speeds appropriate for different lengths of hose or characters of nozzles or the like employed in connection with it.

Other objects of the invention will appear from the following description and the invention will be claimed at the end hereof but first described in connection with the embodiment, but not the only embodiment, of it chosen for illustration in the accompanying drawings in which is illustrated partly in plan and partly in section parts embodying features of the invention together with so much of an automobile fire engine as is necessary for a description of the invention.

In the drawings 1, is a primary shaft which, as is well known, is driven at different speeds from the engine 2, which runs at a substantially constant speed.

3, is a differential and brake sleeve which is driven by the primary shaft 1, through the intervention of bevel gears 4. There is wheel-driving-gear driven from the primary shaft 1. In the construction which happens to have been chosen for illustration the wheel-driving-gear comprises what is known as a chain drive or transmission and, generally speaking, consists of tooth sprockets 5, sprocket chains 6, differential shafts 7, and the differential gearing 8. The driving gear will vary more or less as will also certain other details with different types of automobiles but from a description of the invention in connection with the type of automobile chosen for illustration the invention will be readily understood.

9, is a rotary pump which is carried by the automobile and is usually arranged with its axis crosswise thereof. There are driving means interposed between the pump 9, and the primary shaft, and an example of these means are the gears 10, 11 and 12, interposed between the differential brake sleeve 3, and the pump. As shown the gear wheel 10, is applied to the brake drum 13, which in turn is connected with the sleeve 3. The gear wheel 11, is mounted upon a stud 14 in such a way that it can be moved laterally along the stud, so that it may be thrown into and out of mesh with the other gear wheels 10 and 12 of the train so as to put the pump into and out of operation.

15, are clutches shown as of the sliding variety, though any appropriate variety will do, and they serve to connect and disconnect the primary shaft 1, and the wheel-driving-gear.

In use the automobile fire engine is driven or propelled from place to place like any automobile but the pump is disconnected from the primary shaft 1, and in the construction selected for illustration this is accomplished by throwing the gear wheel 11, out of mesh. When it is desired to operate the pump, for example, upon arrival at a fire, the wheel-driving-gear is disconnected from the primary shaft 1, for example, by throwing out the clutches 15, and the pump is connected up with the primary shaft 1, so as to be driven thereby, for example, by throwing the gear wheel 11, into mesh. These changes should be rapidly made and connecting and disconnecting mechanism which can be operated rapidly is the most appropriate for the purpose. Since the primary shaft is driven from the engine through the intervention of mechanism, not shown, by means of which its speed can be changed in respect to the speed of the engine, it follows that the pump may run at different speeds appropriate for the use of different lengths of hose or other conditions of service, while the engine runs at a substantially constant speed. In view of the characteristics of an automobile engine, which is of the internal explosion variety, and of the characteristics of a pump in fire service, it is evident that the ability to manually change the speed of the pump in respect to the speed of the engine is a matter of great importance because the engine can be operated at its most economical speed and the pump can be operated at such speed as is appropriate for the different conditions that are encountered in fire service.

Inasmuch as the parts of an automobile fire engine which are used in connection with my invention assume various forms and various detail inter-relations, I do not desire to limit my invention by reason of these facts or by reason of the fact that I have illustrated the embodiment of the invention which I believe to be the best and have not illustrated additional embodiments.

However, what I claim is:

In an automobile fire engine the combination of a shaft, a change speed transmission mechanism for driving the shaft at different speeds the differential-and-brake sleeve driven by said shaft at different speeds, a wheel-driving-gear driven by said shaft, a pump, means interposed between the pump and sleeve for driving the pump, and devices for connecting and disconnecting said shaft and wheel-driving-gear and said sleeve and pump, substantially as described.

In testimony whereof I have hereunto signed my name.

J. LIVINGSTON POULTNEY.

Witnesses:
CLIFFORD K. CASSEL,
K. M. GILLIGAN.

Copies of this patent may be obtained for five cents each, by addressing the "Commissioner of Patents, Washington, D. C."